Oct. 7, 1941.                       W. F. KRENZKE                       2,258,061
                                ROLLER AND SOD CONDITIONER
                                   Filed Feb. 7, 1940                 2 Sheets-Sheet 1

INVENTOR
WILLIAM F. KRENZKE
BY A.S.Kroh
ATTORNEY

Oct. 7, 1941.  W. F. KRENZKE  2,258,061
ROLLER AND SOD CONDITIONER
Filed Feb. 7, 1940   2 Sheets-Sheet 2

INVENTOR
WILLIAM F. KRENZKE
BY A.S.Krob
ATTORNEY

Patented Oct. 7, 1941

2,258,061

UNITED STATES PATENT OFFICE 2,258,061

ROLLER AND SOD CONDITIONER

William F. Krenzke, Racine, Wis., assignor to Jacobsen Manufacturing Company, Racine, Wis., a company of Wisconsin Application February 7, 1940, Serial No. 317,620

9 Claims. (Cl. 97—48)

The present device relates to power driven sod rollers having means for conditioning the sod. The conditioners may be secured to the roller as an attachment which is easily attached and easily removed or adjusted.

It is a further object to provide a sod stripper as an attachment which is easily attached, removed or adjusted.

One of the objects of the present invention is to provide sod conditioning and stripping attachments for sod rollers of a design whereby no extra cost is added to the roller per se.

A further object of my invention is to provide a sod conditioner and stripper whereby they may be operated simultaneously or independently.

To these and other useful ends, my invention consists of parts, combinations of parts, or their equivalents, and mode of operation, as hereinafter set forth and claimed and shown in the accompanying drawings in which:

Figure 1:
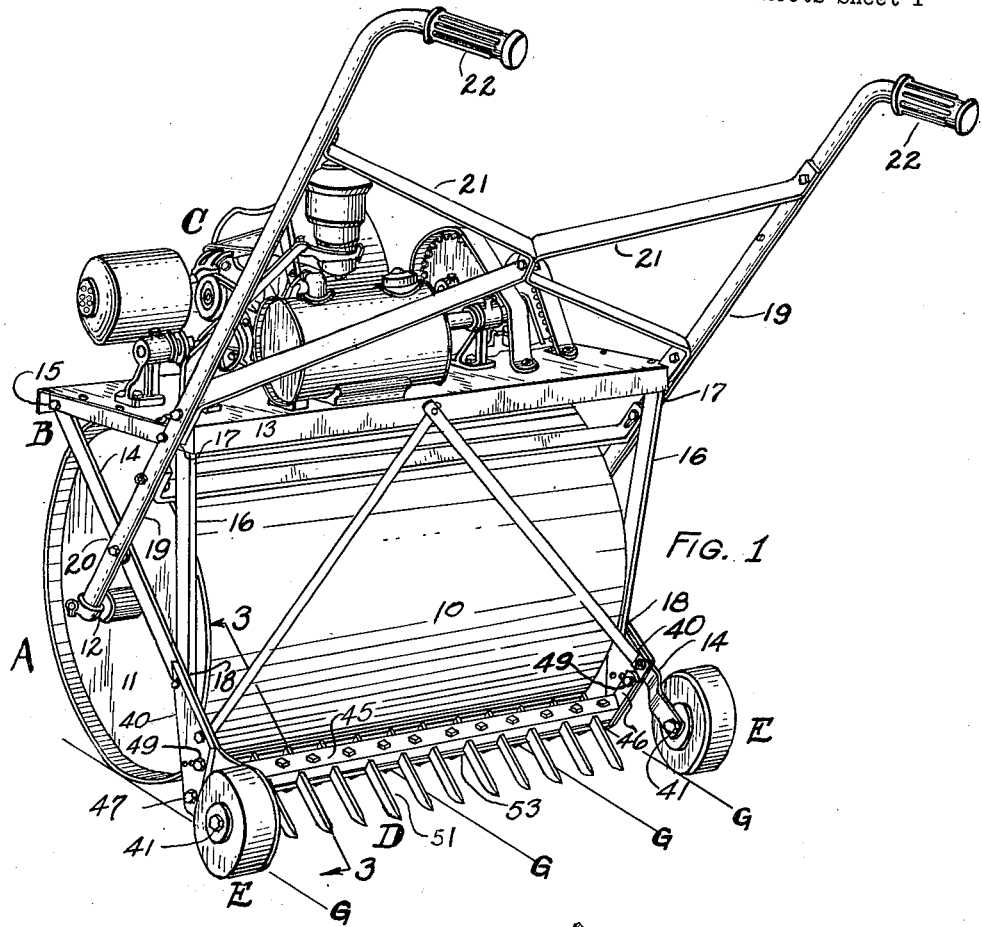
Fig. 1 is a perspective view of my sod roller having attached thereto my preferred form of sod conditioner.
Figure 2:
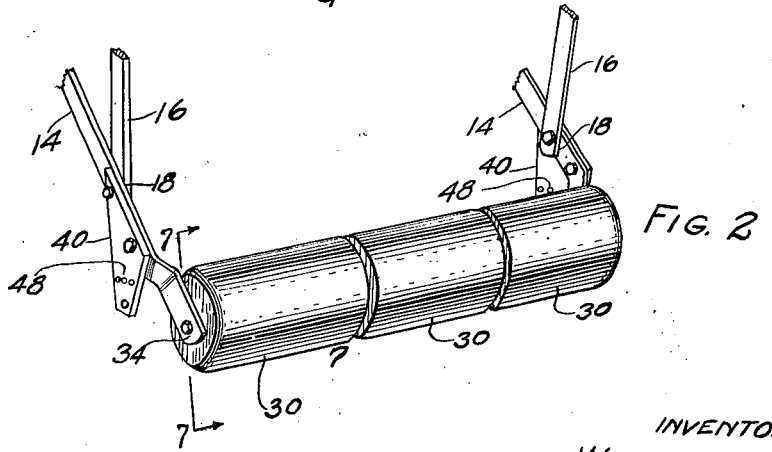
Fig. 2 is a perspective drawing of a fraction of the roller frame as shown in Figure 1 illustrating the supporting roller which is preferred when my improved conditioner or stripper is not attached.

As thus illustrated, the drum is designated by reference character A. The main frame of the device is designated by reference character B. The power mechanism is designated by reference character C. The sod conditioning attachment, the rear supporting wheels and the roller supporting means are designated in their entireties by reference characters D, E and F respectively.

Drum A is preferably made from sheet steel comprising the circular shell 10 and end heads 11—11, the end heads being journaled to frame B as at 12—12 in any suitable manner.

Frame B comprises a top platform 13 and main side members 14—14 which are secured at their front ends to member 13 as at 15. Rear brace bars 16—16 are secured to member 13 as at 17—17 and to members 14 as at 18—18.

Handle members 19—19 are secured to member 13 as at 17—17 and extend forward and downward, the lower ends being adapted to carry the bearings of member A as at 12. Members 19 are secured to members 14 as at 20—20. Suitable braces 21—21 are provided as illustrated and are adapted to secure handle pieces 22—22 in spaced relation and form a rigid attachment for the handles to member B.

Unit C comprises an internal combustion engine, a clutch and transmission and preferably a chain drive connection to drum A and all necessary appurtenances for a power unit of the class including control levers (not shown) which extend to within easy reach of the operator.

For rolling sod, preferably three wood rollers 30 are provided each being rotatably mounted on tube 32, the tube being attached to frame B as follows: A threaded sleeve 33 is secured into the ends of tube 32. Member 32 is adapted to fill the space between the rear ends of members 14 and is secured thereto by means of cap screws 34.

Rollers 30 will act to support some of the weight of the frame thus to form a stable unit which, when being operated, need only be directed by the operator and since the major part of the weight of the roller is on member A, the operator may easily lift rollers 30 off the ground for very short turning and for other obvious purposes.

Thus I have disclosed and described my sod roller per se. I will now describe the conditioning and stripping attachments.

Figure 3:
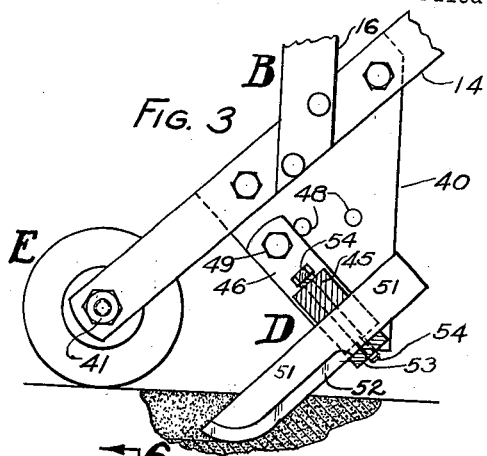
Fig. 3 is a fractional sectional view taken on line 3—3 of Figure 1.
Figure 4:
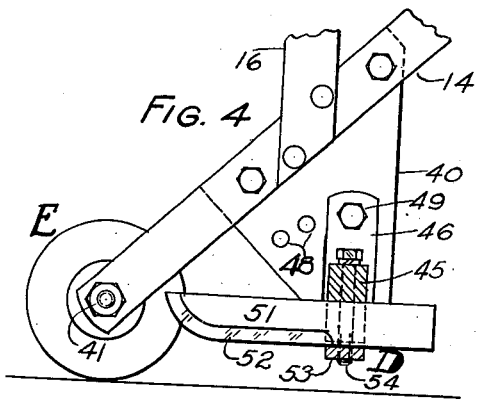
Fig. 4 is a view similar to Figure 3 except showing the conditioner blades moved to their inoperative position.

For conditioning sod, I provide means for cutting the sod in narrow ribbons without severing the root system in a manner which will loosen and aerate the soil as follows:

I provide two brackets 40—40 each being shaped and secured to members 14 as clearly shown in Figures 3 and 4. For sod conditioning, short rubber rimmed rollers E are rotatably mounted on the rear ends of members 14 (see Figures 1, 3, 4, 5 and 6) by means of suitable bearings and bolts 41—41. These bolts are slightly longer than necessary and the rear ends of members 14 are offset as clearly illustrated in Figures 1, 2, 5 and 7 for purposes which will hereinafter appear.

Figure 6:
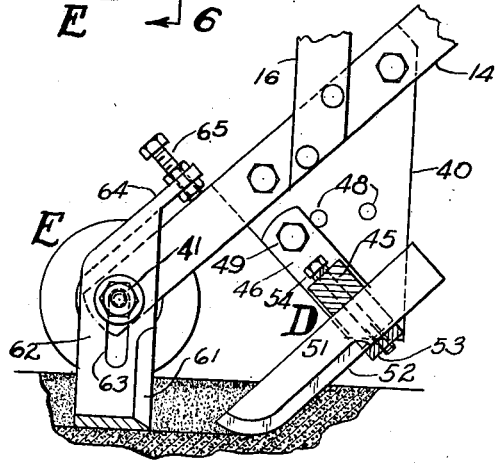
Fig. 6 is a sectional view taken on line 6—6 of Figure 5.
Figure 7:
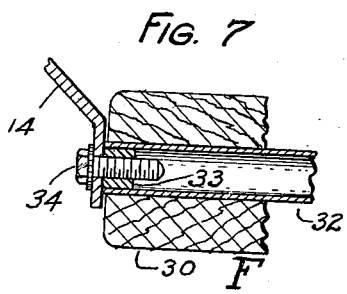
Fig. 7 is a fractional section of one end of the roller illustrated in Figure 2 and taken on line 7—7 of this figure.

I provide a knife bar 45 having welded to each end plates 46—46. These members are each drilled and tapped near the longtiudinal center of the bar and secured to the inner surface of plates 40 by means of cap screws 47—47. Thus it will be seen that bar 45 is hingedly secured to members 40. Three or more apertures 48 are provided and positioned on a radius with bolt 47 and apertures are provided in plates 46 which register with apertures 48. Thus bolts 49—49 may be used to secure bar 46 to member 40 as illustrated in Figures 3 and 6 or as shown in Figure 4 for reasons which will hereinafter appear.

Figure 5:
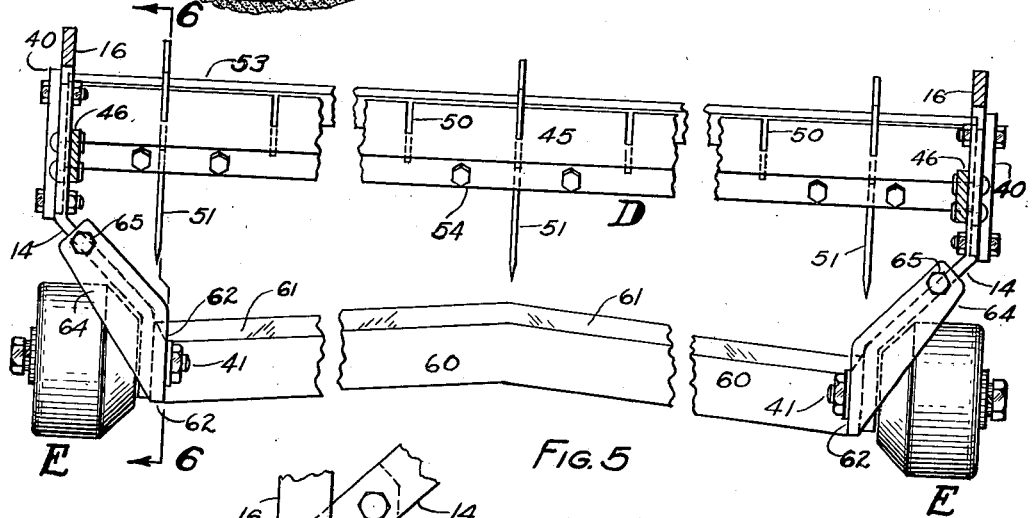
Fig. 5 is a fractional view of the main frame of the device having attached thereto the conditioner and the stripper blade.

Bar 45 is provided with a number of spaced slits 50 (see Figure 5). For sod conditioning, I fit into each of these slits a knife blade 51 each being sharpened as at 52. These blades are slightly wider than the depth of slits 50 so the blades may be securely held in the slits by means of a bar 53 and cap screws 54 as clearly shown in Figures 3 to 6 inclusive.

Thus it will be seen that the blades may be adjusted longitudinally on bar 45 and positioned at two working angles. Furthermore by moving bars 46 and bolt 49 to the front aperture 48, the blades will be held in their inoperating position as shown in Figure 4. Clearly the blades may be adjusted in the slits for different depths of cut in the sod.

Thus it will be seen that by the use of rollers E, the loosened sod will not be packed immediately. However, if this is desired, rollers 30 may be used for the purpose. It will also be seen that by using the intermediate orifice 48, the angle of blades 51 may be considerably increased and the same depth of cut secured if desired by moving the blades rearwardly in their slits.

Sod slicing may be accomplished by the use of a special attachment as follows:

A U-shaped blade 60 is sharpened as at 61. The vertical end members 62 are slotted as at 63. Bolts 41 are adapted to extend through these slots thus member 60 may be moved to cut any desired depth. The tops of members 62 are bent outwardly so as to provide brackets 64, each having at its forward end a bolt 65 and nuts whereby the desired cutting angle of blade 60 may be obtained.

If narrow strips of sod are desired for transplanting, then all or every other blade will be left in bar 45. Generally the correct width of sod strip will be cut by using three blades as shown in Figure 5 wherein it will be noted that the two end blades cut a path for member 62. Thus clearly my device may be used for the successful cutting free of transplanting sod strips of any desired thickness and width.

It will be understood that any minor changes in details may be made without departing from the spirit and scope of my invention as recited in the appended claims.

Having thus shown and described my invention, I claim:

1. A sod conditioner of the class described, comprising a tractor having a frame with forward carrying and driving means and rear supporting means, a sod slicer mounted on said frame and being positioned in rear of said driving means, said sod slicer comprising a bar having mounted thereon a number of spaced blades the lower rear edges of which are sharpened and being positioned at a rearward declining angle, said bar being hingedly mounted at its ends and having means whereby the cutting angle of said blades may be increased or decreased.

2. A sod conditioner of the class described, comprising a tractor having a frame with a front driving and carrying drum rotatably mounted thereon and rear supporting means therefor, a sod conditioning device positioned transverse to the direction of travel and adjacent said rear supporting means, said sod conditioning device comprising a bar having a number of spaced blades mounted therein, said bar adapted to support said blades at a rearward declining angle whereby the sod is cut into a number of strips, said bar being hingedly mounted and having adjusting means whereby the cutting angle of said blades may be optionally secured.

3. A device of the class described, comprising a frame having rotatably mounted thereon a front end driving and carrying drum and having at its rear end rotatably mounted supporting means, said frame having a platform and a power unit mounted thereon, said platform having secured to its front corners rearwardly and downwardly extending frame bars, handle bars secured to the rear corners of said platform, the forward end extending forwardly and downwardly and being secured to said first bars and extending a distance therefrom and having said drum mounted on their lower ends, the rear end of said handle bars extending rearwardly and upwardly and having therebetween brace members, said power unit having a transmission and a driving connection to said drum, said rear carrying means being mounted on the rear end of said first bars, a brace extending from the rear corners of said platform downwardly and being secured at their lower ends to said first bars.

4. A sod conditioner of the class described, comprising a frame having front and rear rotatably mounted supporting means, a bar secured to said frame and positioned transverse to the direction of travel and in rear of said front supporting means, said bar having transversely spaced slits on its underside, rearwardly extending blades positioned in said slits and being somewhat wider than the depth of said slits, another bar positioned on the protruding edges of said blades and being removably secured to said first bar whereby said blades may be adjusted longitudinally or removed and replaced, said first bar having adjusting means whereby said blades may be positioned at predetermined angles.

5. A sod conditioner of the class described, comprising a tractor having a frame with forward carrying and driving means and rear supporting means rotatably mounted thereon, a sod slicer positioned between said driving and supporting means, said sod slicer comprising a bar having mounted thereon a number of spaced blades, the lower rear edges of said blades being sharpened and positioned at a rearward declining angle, a stripper blade having vertically extending end members secured to said frame in rear of said slicer, the vertical ends of said stripper being hingedly and vertically adjustably secured to the rear end of said frame and being in alignment with the end blades on said slicer.

6. A device as recited in claim 5 including; certain said blades being removed from said slicer whereby a predetermined width of sod strips may be cut free.

7. A device as recited in claim 5 including; means on the vertical ends of said stripper contacting the side members of said frame whereby the down suck of said stripper blade may be optionally secured.

8. A sod conditioner of the class described, comprising a tractor having forward carrying and driving means and rear supporting means, a sod slicer positioned between said driving and supporting means, said sod slicer comprising a bar having mounted thereon a number of spaced blades having their lower rear edges sharpened and positioned at a rearward declining angle, said blades being adjustable longitudinally whereby the sod may be cut at predetermined depths.

9. A sod conditioner of the class described, comprising a tractor having a frame with forward carrying and driving means and rear supporting means, a sod slicer positioned between said driving and supporting means, said sod slicer comprising a bar having mounted thereon a number of spaced blades, the lower rear edges of said blades being sharpened and positioned at a rearward declining angle, a stripping blade having vertically extending end members being vertically adjustably secured to the rear end of said frame and being in alignment with the end blades on said slicer, means whereby said blades may be manually adjusted as to their depth and cutting angle.

WILLIAM F. KRENZKE.